United States Patent
Aschenbruck et al.

(10) Patent No.: US 9,752,672 B2
(45) Date of Patent: Sep. 5, 2017

(54) TRANSMISSION TURBO MACHINE

(71) Applicants: Emil Aschenbruck, Duisburg (DE); Carsten Bennewa, Oberhausen (DE); Sven Boje, Wesel (DE); Bernd Risse, Bochum (DE); Philipp Gingter, Mönchengladbach (DE)

(72) Inventors: Emil Aschenbruck, Duisburg (DE); Carsten Bennewa, Oberhausen (DE); Sven Boje, Wesel (DE); Bernd Risse, Bochum (DE); Philipp Gingter, Mönchengladbach (DE)

(73) Assignee: MAN Diesel & Turbo SE, Augsburg (DE)

( * ) Notice: Subject to any disclaimer, the term of this patent is extended or adjusted under 35 U.S.C. 154(b) by 1002 days.

(21) Appl. No.: 14/030,832

(22) Filed: Sep. 18, 2013

(65) Prior Publication Data
US 2014/0076081 A1    Mar. 20, 2014

(30) Foreign Application Priority Data

Sep. 19, 2012  (DE) ........................ 10 2012 018 468

(51) Int. Cl.
F16H 57/04     (2010.01)
F01D 13/00     (2006.01)
F01D 25/28     (2006.01)
F01D 15/10     (2006.01)
F01D 15/12     (2006.01)

(52) U.S. Cl.
CPC ......... *F16H 57/0413* (2013.01); *F01D 13/00* (2013.01); *F01D 15/10* (2013.01); *F01D 15/12* (2013.01); *F01D 25/28* (2013.01); *Y10T 74/19647* (2015.01)

(58) Field of Classification Search
CPC .......... F01D 15/12; F01D 15/10; F01D 13/00; F01D 25/08; F01D 25/12; F01D 25/28; F16H 57/0413; Y10T 74/19647
See application file for complete search history.

(56) References Cited

U.S. PATENT DOCUMENTS 4,219,306 A * 8/1980 Fujino ................... F04D 25/163
                                                          415/62
4,953,355 A    9/1990 Poulain et al.
(Continued)

FOREIGN PATENT DOCUMENTS

DE    689 02 198 T2    1/1993
DE    197 21 050 C2    4/1999
(Continued)

*Primary Examiner* — Dwayne J White
*Assistant Examiner* — Adam W Brown
(74) *Attorney, Agent, or Firm* — Cozen O'Connor

(57) ABSTRACT

A transmission turbo machine integrates drive units and/or driven units into a machine train via a transmission. The integrated transmission substantially comprises a central large wheel with a shaft and a plurality of pinions with pinion shafts. The large wheel is operatively connected to the pinions, and the ends of the pinion shafts are operatively connected to a drive unit and/or driven unit. The shaft of the large wheel is operatively connected to a drive unit and/or driven unit. The invention is characterized in that the drive unit and/or driven unit is an axial expander which is mounted in a cantilevering manner in one or more stages.

9 Claims, 2 Drawing Sheets

(56) References Cited

U.S. PATENT DOCUMENTS

| | | | | |
|---|---|---|---|---|
| 5,382,132 A | * | 1/1995 | Mendel | F04D 25/163 |
| | | | | 415/122.1 |
| 5,402,631 A | * | 4/1995 | Wulf | F02C 3/107 |
| | | | | 415/66 |
| 6,050,780 A | * | 4/2000 | Hasegawa | F04D 27/0261 |
| | | | | 417/423.5 |
| 6,615,586 B1 | * | 9/2003 | Boric | B63H 21/20 |
| | | | | 60/729 |
| 7,559,200 B2 | * | 7/2009 | Rodehau | F04D 25/163 |
| | | | | 60/605.1 |
| 8,414,250 B2 | | 4/2013 | Hansen et al. | |
| 2006/0156728 A1 | | 7/2006 | Rodehau et al. | |
| 2009/0297337 A1 | * | 12/2009 | Hansen | F04D 25/02 |
| | | | | 415/122.1 |

FOREIGN PATENT DOCUMENTS

| | | |
|---|---|---|
| EP | 0512568 | 11/1992 |
| EP | 2 128 448 A2 | 12/2009 |
| EP | 1 691 081 B1 | 3/2010 |
| GB | 210 456 A | 5/1924 |
| JP | S 54-117916 | 9/1979 |
| JP | H 02-81906 | 3/1990 |
| JP | H 05-149147 | 6/1993 |
| JP | H 09-119378 | 5/1997 |
| JP | 2006-200531 | 8/2006 |

\* cited by examiner

TRANSMISSION TURBO MACHINE

BACKGROUND OF THE INVENTION

1. Field of the Invention

The invention is directed to transmission turbo machine which integrates drive units and/or driven units into a machine train via a transmission, wherein the integrated transmission substantially comprises a central large wheel with a shaft and a plurality of pinions with pinion shafts, wherein the large wheel is operatively connected to the pinions, and the ends of the pinion shafts are operatively connected to a drive unit and/or driven unit, wherein the shaft of the large wheel is operatively connected to a drive unit and/or driven unit.

2. Description of the Related Art

A multistage transmission turbo machine with integrated transmission and with drive units and/or driven units is described in EP 1 691 081 B1. Drive units and/or driven units are compressors, steam turbines, gas turbines, motors, generators and expanders. On the one hand, the arrangement of these units in the same horizontal plane is particularly advantageous. On the other hand, the presence of a large wheel and an additional drive pinion allows a large number of options to be integrated for the drive units and/or driven units that can be used. Machine trains according to EP 1 691 081 B1 constructed in the manner described above are known from in-house practice, but have drawbacks with respect to the expanders which may be optionally incorporated. Arrangements of this kind merely comprise radial expanders; but it is disadvantageous that the volume flows that can be realized are limited so that the structural possibilities of radial expanders are limited by the structural sizes that can be implemented. Apart from radial expanders whose structural volumes are too large for the machine train, even radial expanders within the range of the structural limit have the disadvantage of higher material costs because expensive high-alloyed materials, and often also double-shell housing arrangements, are required a priori. Owing to limited geometries, particularly relating to the large wheel, the structural volume for the units of the machine train of a transmission turbo machine and, therefore the processing of ever higher volume flows, are limited.

SUMMARY OF THE INVENTION

It is the object of the invention to design the generic transmission turbo machine with integrated transmission in such a way that the aforementioned disadvantages are overcome and that, further, it is possible to connect an axial expander to the housing even at high inlet temperatures of the medium to be expanded.

According to one aspect of the present invention, this object is met in a generic transmission turbo machine with integrated transmission in which the drive unit and/or driven unit is an axial expander mounted in a cantilevering manner in one or more stages.

By means of the transmission turbo machine designed according to the present invention, a machine train can be built which makes use of the basic advantages of the higher volume flows of an axial expander and at the same time takes into account the fluidic and thermal loads ensuing therefrom.

According to an aspect of the present invention, the axial expander is connected to the housing of the transmission of the transmission turbo machine in the initial axial housing region so that a rotationally fixed connection to the axial expander is effected by means of the pinion wheels thereof. The flow-in channels for the process medium which is to be expanded, and which is very hot, are located radially at the axial beginning of the axial expander and, contrary to radial expanders, the hot process gas is in the immediate vicinity of the transmission housing. To prevent negative influences on the functionality of the transmission and in particular of the housing, the transitional area between the axial expander and transmission is cooled by a coolant.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
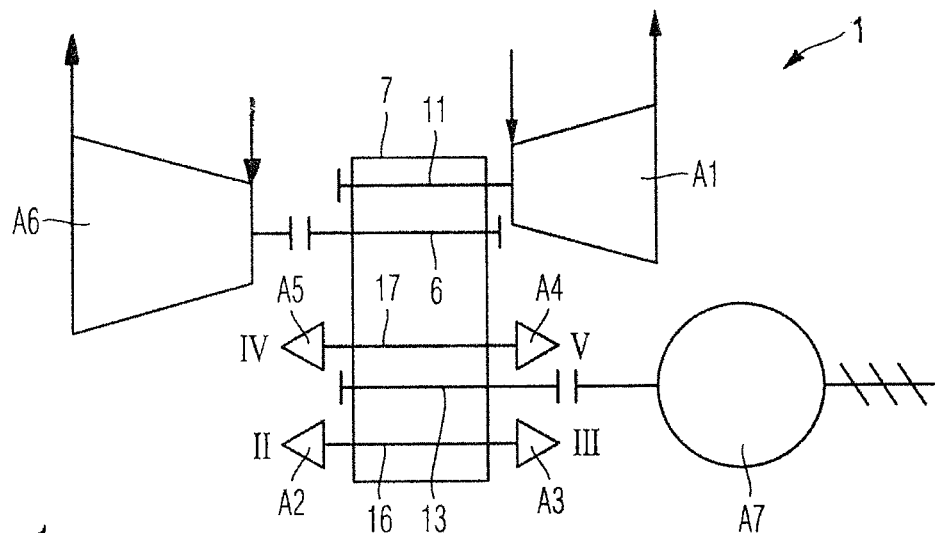
FIG. 1 is a schematic view of a transmission turbo machine with transmission and drive units and driven units.

The transmission turbo machine 1 shown in FIG. 1 is part of a chemical installation for the handling and further processing of gases. A transmission turbo machine 1 of this type integrates drive units and driven units A1, A2, A3, A4, A5, A6, A7 into a machine train via a transmission 2, wherein possible drive units are steam turbines, gas turbines, expanders and engines, while possible driven units are compressors and generators.

Figure 2:
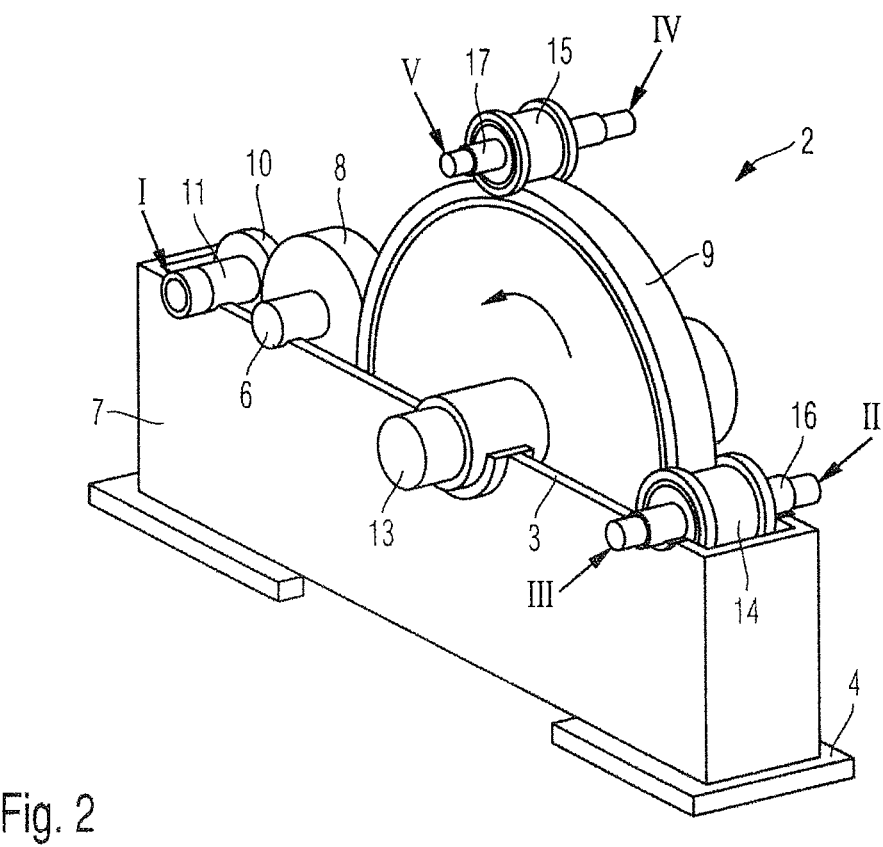
FIG. 2 is a perspective view of the transmission of a transmission turbo machine.

The individual units are interconnected and mounted on one or more base frames, namely, the machine foundations 4 shown by way of example in FIG. 2. Located below the machine foundations 4 are the coolers, condensers and other apparatus which are necessary for the operation of the machine train but which are not shown in FIGS. 1 and 4 and are not relevant to the invention.

Depending on the type of chemical process to be conducted, an axial expander A1, a steam turbine A6 and a motor A7 can be formed together or individually as drive units A1, A6, A7. The axial expander A1 is operatively connected via the pinion shaft 11, the steam turbine A6 is operatively connected via drive shaft 6, and the motor A7 is operatively connected via shaft 13 of the large wheel 9 of the transmission turbo machine 1.

The transmission 2 of the transmission turbo machine 1 according to FIG. 2 comprises a housing 7 in which a driving pinion 8, a large wheel 9 and further pinions 10, 14, 15 are arranged. The drive pinion 8 is fastened to the driveshaft 6 which is bearing-mounted in the housing 7 of the transmission turbo machine 1. The drive pinion 8 engages with a first pinion 10 which is fastened to a first pinion shaft 11 so as to be fixed with respect to rotation relative to it. The first pinion shaft 11 has at its end an impeller which is connected to an axial expander A1 so as to be fixed with respect to rotation relative to it, the axial expander A1 being mounted in a cantilevering manner in one or more stages.

On the side remote of the first pinion 10, the drive pinion 8 engages with the large wheel 9, which is fastened to a shaft 13 mounted in the housing 7, so as to be fixed with respect to rotation relative to it. The output of the drive unit A6 transmitted via the drive pinion 8 is simultaneously transferred to the large wheel 9 and the first pinion 10 associated with the axial expander A1.

The large wheel 9 engages with a second pinion 14 and a third pinion 15, which are connected respectively to a second pinion shaft 16 and a third pinion shaft 17 so as to be fixed with respect to rotation relative thereto, the second pinion shaft 16 and the third pinion shaft 17 being mounted in the housing 7. The second pinion shaft 16 has at its end the impellers of the compressor stages II, III. The third pinion shaft 17 carries at its ends the impellers of compressor stages IV, V. All of the expander stages and compressor stages are mounted in a cantilevering manner on the corresponding pinion shafts.

The driveshaft 6, the first pinion shaft 11, the second pinion shaft 16 and the shaft 13 of the large wheel 9 lie in the same horizontal plane 3. The third pinion shaft 17 lies above this plane 3. In the illustration in FIG. 2, the drive pinion 8 is preferably in the 9 o'clock position, the second pinion 14 is preferably in the 3 o'clock position and the third pinion 15 is preferably at the 12 o'clock position with respect to the large wheel 9. With respect to the drive pinion 8, the first pinion 10 is preferably in the 9 o'clock position and the large wheel 9 is preferably in the 3 o'clock position.

The transmission 2 according to FIG. 2 described above forms the basis for the entire transmission turbo machine 1. The transmission 2 is the core of a machine train substantially comprising drive units and driven units A1, A2, A3, A4, A5, A6, A7.

In the exemplary embodiment, the transmission 2 integrated in the machine train substantially comprises a central large wheel 9 with a shaft 13, a plurality of pinions 10, 14, 15 with pinion shafts 11, 16, 17 and a drive pinion 8 with driveshaft 6. The large wheel 9 engages with the pinions 14, 15 and the ends of the pinion shafts 16, 17 are connected to driven units A2, A3, A4, A5 so as to be fixed with respect to rotation relative to it. These driven unit A2, A3, A4, A5 are preferably the compressors A2, A3, A4, A5 of compressor stages II to V. The large wheel 9 likewise engages with the drive pinion 8 which is connected via the ends of the driveshaft 6 to a drive unit A6 so as to be fixed with respect to rotation relative to it. In the exemplary embodiment, the shaft 13 of the large wheel 9 is connected to a motor or generator A7. The drive pinion 8 engages in turn with pinion 10, and the ends of the pinion shaft 11 are connected to an axial expander A1 so as to be fixed with respect to rotation relative to it, the axial expander A1 serving as drive unit.

Figure 3:
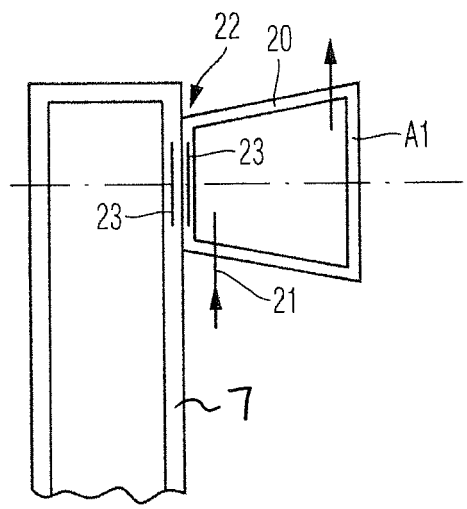
FIG. 3 is a detailed view illustrating the cooling in the housings of the transmission and axial expander.
Figure 4:
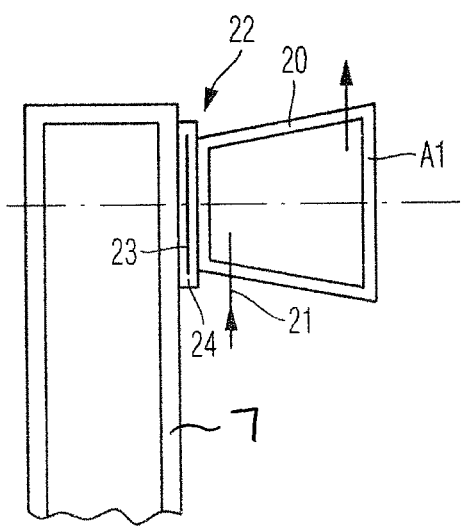
FIG. 4 is a detailed view showing the cooling in the intermediate wall between the housings of the transmission and axial expander.

With reference to FIGS. 3 and 4, the housing 20 of the axial expander A1 is flanged to the housing 7 such that the flow inlet area 21 of the axial expander A1 directly adjoins the housing 7 of the transmission 2, wherein the transitional area 22 between axial expander A1 and transmission 2 is cooled by a coolant. Depending on the type of drive units or driven units A1, A2, A3, A4, A5, A6, A6, the suitable amount, and possibly also the selection, of coolant may depend on the temperatures of the respective process media at the inlet and/or outlet of the respective drive units or driven unit A1, A2, A3, A4, A5, A6, A6.

In the exemplary embodiment according to FIGS. 1 and 2, the transmission turbo machine 1 comprises a steam turbine A6 as drive unit so that the coolant requirement and selection of coolant is determined in this case by the inlet temperature of the steam entering the steam turbine A6. Preferable coolants are conceivably steam and air which can be removed from the processes of the transmission turbo machine on the one hand or from adjacent processes and external sources on the other hand.

In a preferred embodiment illustrated in FIG. 3, ducts 23 for the coolant are located either in the housing 20 of the axial expander A1 or in the housing 7 of the transmission 2; but ducts 23 for cooling are also possible in both housings 7 and 20.

Alternatively, as shown in FIG. 4, an intermediate wall 24, in which the ducts 23 for the coolant are arranged, can be arranged between the housing 20 of the axial expander A1 and the housing 7 of the transmission 2. In this respect, it may be advantageous that the ducts 23 are arranged exclusively in the intermediate wall 24 so that the structural configuration of the housings 7 and 20 need not be altered. Depending on application, however, it may also be useful to integrate the ducts 23 for cooling in both the intermediate wall 24 and the housings 7 and 20; this makes it possible to achieve an even better heat dissipation.

The direct connection of the housing 20 of the axial expander A1 to the housing 7 of the transmission 2 of the transmission turbo machine 1 does not require any additional connection shafts. Ideally, the shaft of the axial expander A1 is directly coupled with the pinion shaft 11 so as to be fixed with respect to rotation relative to it and is mounted in a cantilevering manner in one or more stages. This results in a compact arrangement and, moreover, separate machine foundations 4 can also be omitted in an advantageous embodiment of the arrangement according to the invention. In addition to the advantages with respect to space, this arrangement requires substantially less material for the shared machine foundation 4 and there are ultimately also advantages for the layout of the overall arrangement with respect to vibrations.

The driven units (A2, A3, A4, A5) arranged at the pinion shafts (16, 17) are constructed as compressor stages (II, III, IV, V) for the functionality of the machine train according to the invention. A steam turbine or gas turbine A6 as drive unit A6 is operatively connected to the drive pinion 8 so as to be fixed with respect to rotation relative to it. However, other turbo engines as well as electric drives or combustion drives could also be used as a drive unit.

The motor/generator A7, as the drive unit, engages with the shaft 13 of the large wheel 9 directly or via a transmission 2, but can also be omitted depending on the type of chemical process.

The transmission turbo machine 1 can be started by a turbo engine, for example, a steam turbine or gas turbine A6, an electric driving engine or in special cases also by an internal combustion engine as drive unit. The motor A7 (motor/generator A7) in motor circuit) then takes over the driving of the machine train starting from the synchronous speed of the motor A7. The axial expander A1 first transmits power when the machine train and the associated chemical process are put into operation and the waste gas or waste steam from the process drives the axial expander A1. The axial expander A1 can also be operated by air that has been compressed by one of the compressors A2, A3, A4, A5 of the transmission turbo machine 1 so that a portion of the energy can be recycled.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A transmission turbo machine (1) which integrates drive units and/or driven units (A1, A2, A3, A4, A5, A7) into a machine train via a transmission (2), the transmission (2) comprising:
   a central large wheel (9) with a shaft (13);
   a plurality of pinions (10, 14, 15) with pinion shafts (11, 16, 17); and
   a transmission housing (7) in which the central large wheel (9) and the plurality of pinions (10, 14, 15) are arranged,
   wherein the central large wheel (9) is operatively connected to the pinions (10, 14, 15), and each of the pinion shafts (11, 16, 17) has an end operatively connected to a respective drive unit and/or driven unit (A1, A2, A3, A4, A5), the shaft (13) of the central large wheel (9) being operatively connected to a drive unit and/or driven unit (A7), wherein at least one of the drive units and/or driven units (A1) is an axial expander mounted in a cantilevering manner in one or more stages.

2. The transmission turbo machine (1) according to claim 1, wherein the axial expander (A1) has a housing (20) that is flanged to the transmission housing (7) such that a flow inlet area (21) of the axial expander (A1) directly adjoins the transmission housing (7), and a transitional area (22) between the axial expander (A1) and the transmission (2) is cooled by a coolant.

3. The transmission turbo machine (1) according to claim 2, wherein the housing (20) of the axial expander (A1) and/or the transmission housing (7) have/has ducts (23) for the coolant.

4. The transmission turbo machine (1) according to claim 3, wherein the housing (20) of the axial expander (A1) is flanged to the transmission housing (7) by an intermediate wall (24), and the intermediate wall (24) contains ducts (23) for the coolant.

5. The transmission turbo machine (1) according to claim 1, further comprising a drive pinion (8) having a driveshaft (6) the drive pinion (8) being arranged in the transmission between the central large wheel (9) and one of the pinions (10, 14, 15), the drive pinion (8) being operatively connected to the central large wheel (9) and to the one of the pinions (10, 14, 15), and wherein the drive pinion (8) is operatively connected to a drive unit (A6).

6. The transmission turbo machine (1) according to claim 1, wherein the integrated transmission (2) and the drive units or driven units (A1, A2, A3, A4, A5, A6, A7) are fastened to a common machine foundation (4).

7. The transmission turbo machine (1) according to claim 1, wherein the driven units (A2, A3, A4, A5) arranged at the pinion shafts (16, 17) are impellers of compressor stages (II, III, IV, V).

8. The transmission turbo machine (1) according to claim 5, wherein the drive unit (A6) operatively connected to the drive pinion (8) is a turbo engine, an electric drive engine or a combustion drive engine.

9. The transmission turbo machine (1) according to claim 1, wherein the drive unit (A7) which is operatively connected to the shaft (13) of the central large wheel (9).

* * * * *